UNITED STATES PATENT OFFICE.

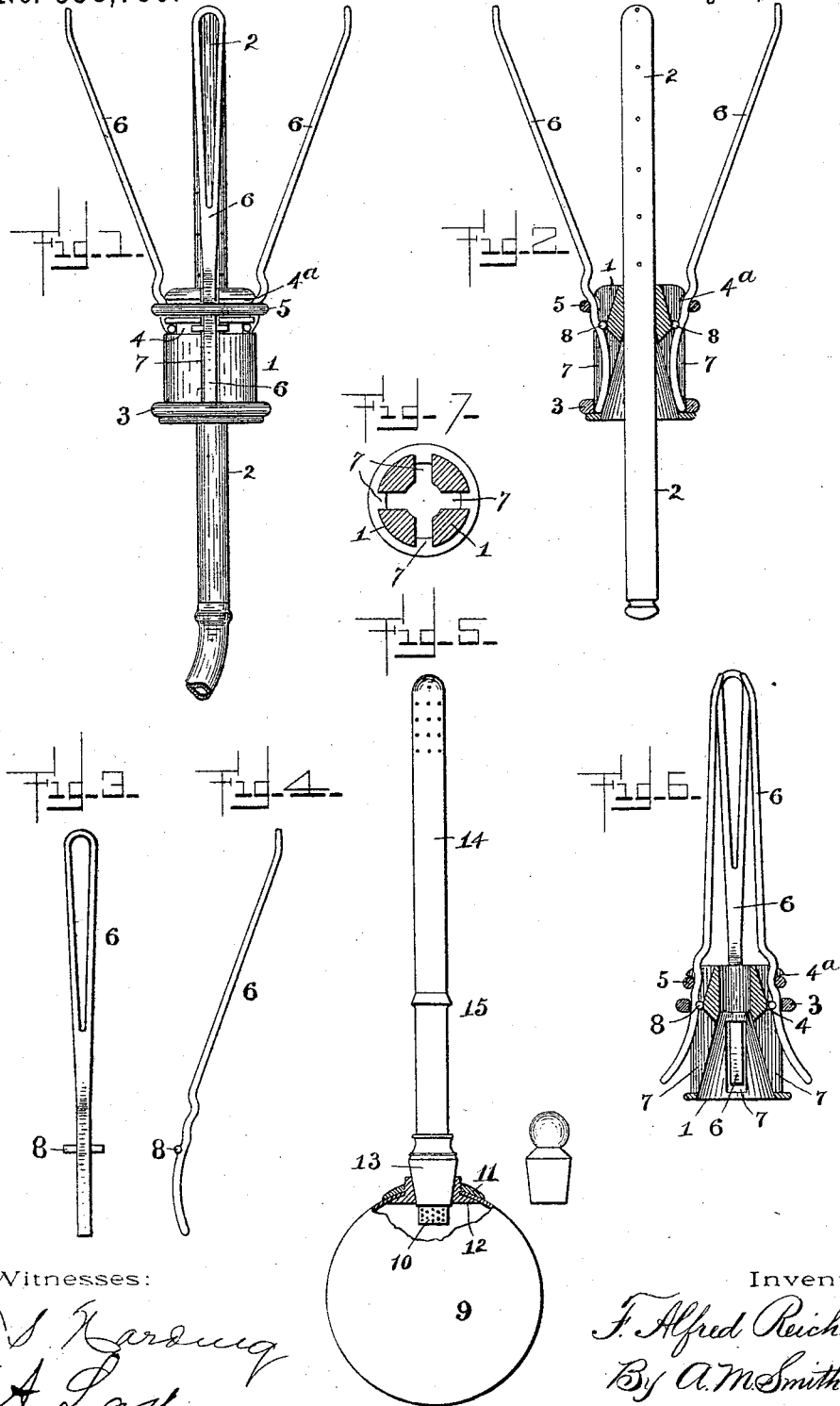

FERDINAND ALFRED REICHARDT, OF NEW YORK, N. Y.

EXPANDING-ARM SYRINGE.

SPECIFICATION forming part of Letters Patent No. 538,790, dated May 7, 1895.

Application filed August 31, 1893. Serial No. 484,518. (No model.)

*To all whom it may concern:*

Be it known that I, FERDINAND ALFRED REICHARDT, a citizen of the United States, residing at the city of New York, in the county of New York and State of New York, have invented a new and useful Improvement in Apparatus for Distending and Treating the Vagina, of which the following is a specification.

My invention relates to a device for treating the vagina and consists in the combination with a suitable hub or sleeve of adjustable spring arms and means connected with and operating upon said arms for expanding or spreading the same; also in the combination therewith, of removable and interchangeable spray pipes or douches, and in certain details of construction and arrangement hereinafter described and pointed out in the claims.

In the accompanying drawings, Figure 1 is a side elevation of my improved device complete, showing an irrigating tube or syringe inserted in the hub or sleeve. Fig. 2 is a vertical section through the same, showing the form of the slots in which the expanding arms lie and illustrating the manner in which the interior of the hub or sleeve is tapered out for the purpose of facilitating the insertion of the tubes. Fig. 3 is a side view of one of the expanding spring-arms. Fig. 4 is an edge view of the same. Fig. 5 is an elevation, partly in section, of a tube, with bulb or blower attached, adapted to be inserted in the hub or sleeve of the device proper. Fig. 6 is a sectional view, similar to Fig. 2, illustrating the manner in which the device is closed or the expanding arms folded preparatory to use or insertion into the vagina. Fig. 7 is a horizontal section through the hub or sleeve for the purpose of showing the location of the slots therein for the reception of the expanding spring-arms.

1 designates the main body of the device, which is in the form of a hollow cylinder, hub or sleeve, as shown, and composed, preferably, of hard or vulcanite rubber, though any other suitable material may be employed. This hub 1 is formed with four longitudinal slots, 7, 7, arranged an equal distance apart around the hub 1.

6, 6, represent the spring arms, which are four in number and arranged around the hub 1, with their inner ends resting in the slots 7. These spring arms are made of spring metal and may be of any preferred form or shape and are provided at a point, intermediate their length with pivots or bearing points 8. The hub 1 is formed with two annular grooves 4 and 4$^a$, the one 4, for the reception of the pivots 8, of the spring arms, and the one 4$^a$ to receive an elastic rubber band or ring 5, which surrounds the hub and lies outside of the spring arms 6 and holds the same in place, preventing their displacement and escape from the slots 7.

3 represents an adjustable or sliding ring of hard rubber or any suitable material, also surrounding the hub 1 and lying outside of the spring arms 6, as shown in the various figures of the drawings. By the vertical adjustment of the ring 3, the inner ends of the spring arms 6 are acted upon for expanding or contracting the outer ends of said spring arms.

2 designates the tube or nozzle of a syringe, extending through and fitting snugly in a perforation through the center of the hub 1. The hub 1 is hollowed out or provided with a conical mouth at the base thereof, as shown, for facilitating the entrance or insertion of the syringe or other tubes, as will appear.

The tube 2 may be removed and the tube 14, of the powder blower, inserted, instead of it. This powder blower is constructed as follows:—9 is a hollow, soft-rubber bulb, in which is inserted an eye 12. To secure the eye and bulb together, the washer 11 is screwed upon said eye. The interior of the eye 12 is conical and adapted to accommodate the shank 13 of the tube 14. The end 10, of the tube 14, which extends within the bulb 9 is perforated with small holes, as illustrated. The other end of this tube 14 may be perforated as illustrated or constructed in any desired form. On account of its form, the shank 13 may be, at pleasure, easily removed from the eye 12, and any other properly formed device substituted for it.

To use my invention, the parts may be put together, as illustrated in Fig. 1. Then the ring 3 is slipped up toward the ring 5, so that the latter may act to close the distending spring arms 6, upon the tube 2. The spring arms thus closed, are now introduced into the vagina. When they have entered to a proper distance, the ring 3 is slipped away from the ring 5 to spread the distending spring arms. This distends the vagina and opens its folds. The end of the tube 2 having been attached to the pipe of a syringe or any other suitable pumping apparatus, clean water, medicated water or any other desired fluid may now be injected into the vagina, through the perforations of the tube 2. This is particularly useful in washing out the vagina preparatory to the use of medicated powders. To apply such powder, it is first put into the bulb 9. The tube 14 is then substituted for the tube 2, and the bulb 9 being attached, such powder may be easily injected by intermittently pressing the said bulb and thus every desired part of the vagina may be reached by the medicinal application.

When a number of different medicated powders are to be used they can be carried in bulbs 9, each of which can be labeled, and when not in use, closed with a neatly fitting india-rubber stopper, which may be inserted into the opening of the eye 12, so that a number of different medicines may be used through the tube 14.

The two ends of the tube 14, are made detachable from each other, by means of a screw-threaded joint at 15 intermediate the ends of the tube. On account of the tube sections being so separable, great facility is afforded for cleaning the inside of such tubes, when required.

Having thus described my invention, what I claim as new, and desire to secure by Letters Patent, is—

1. In an apparatus of the character described, the hollow, cylindrical hub or body 1, provided with the radial, longitudinally extending grooves or slots 7, and the distending spring arms 6, journaled in said slots, on rigid transverse pivots 8 and having the heel extensions beyond said pivots, in combination with the elastic ring 5, surrounding said hub or body and spring arms, for holding the latter in place, and the adjustable ring 3, adapted to slide on said hub or body, over the heel extensions of the spring arms, for adjusting or expanding the latter, all substantially as described.

2. The combination of the hollow-cylindrical hub or body, permitting the use of interchangeable, injection tubes, as described, and having the radial, longitudinal slots or grooves 7, the distending spring arms 6, journaled in said slots, the elastic ring 5 for contracting said spring arms and for holding the same in place, and the sliding ring 3 for distending said spring arms, all arranged and operating, substantially as described.

In testimony that I claim the foregoing as my invention I have hereto signed my name, in presence of two witnesses, this 29th day of April, 1893.

FERDINAND ALFRED REICHARDT.

Witnesses:
   S. G. PATTERSON,
   J. WHITTLE.